United States Patent

Rapeli

Patent Number: 6,167,237
Date of Patent: Dec. 26, 2000

[54] UNIVERSAL WIRELESS COMMUNICATION SYSTEM, A TRANSMISSION PROTOCOL, A WIRELESS COMMUNICATION STATION, AND A RADIO BASE STATION

[75] Inventor: Juha Rapeli, Change, France

[73] Assignee: U.S. Philips Corporation, New York, N.Y.

[21] Appl. No.: 09/031,374

[22] Filed: Feb. 26, 1998

[30] Foreign Application Priority Data

Feb. 28, 1997 [EP] European Pat. Off. .............. 97400477

[51] Int. Cl.$^7$ .................................................. H04B 15/00
[52] U.S. Cl. ............................................. 455/63; 455/522
[58] Field of Search .................................... 455/422, 426, 455/450, 445, 458, 522, 62, 63, 67.1

[56] References Cited

U.S. PATENT DOCUMENTS 5,430,889   7/1995   Hulbert et al. ...................... 455/33.1
5,884,181   3/1999   Arnold et al. ............................ 455/63

*Primary Examiner*—Thanh Cong Le

[57] ABSTRACT

A universal wireless communication system comprising at least two wireless subsystems is proposed which is operated at the edge of spectral efficiency while at the same time allowing wireless communication stations to operate such that optimal power saving is obtained under acceptable transmission conditions. A radio base station of one of the subsystems measures whether a wireless communication station of another one of the subsystems causes adjacent channel interference in a channel its own subsystem. If so, the radio base station commands the wireless communication station of the other substation to adjust its spectral transmission characteristic such that the transmit spectrum becomes narrower. If no interference is detected the wireless communication station of the other subsystem is allowed to broaden its spectrum so that a less complex transmit signal processing, such as filtering, can be applied and thus power saving is achieved.

10 Claims, 4 Drawing Sheets

UNIVERSAL WIRELESS COMMUNICATION SYSTEM, A TRANSMISSION PROTOCOL, A WIRELESS COMMUNICATION STATION, AND A RADIO BASE STATION

BACKGROUND OF THE INVENTION

1. Field of the Invention

The present invention relates to a universal wireless communication system in which an available radio frequency spectrum is divided among at least a first and a second wireless subsystem, the first wireless subsystem comprising at least a first radio base station and a first plurality of wireless communication stations, and the second wireless subsystem comprising at least a second radio base station and a second plurality of wireless communication stations. Such a universal wireless communication system can comprise a plurality of wireless subsystems such as a terrestrial cellular or cordless radio system, a wireless local area network, a satellite system, or any other suitable wireless communication subsystem. The subsystems are able to operate independent of each other.

The present invention further relates to a transmission protocol, to a wireless communication station, and to a radio base station for use in such a system.

2. Description of the Related Art

A universal wireless communication system of the above kind is generally known from many publications about universal wireless communication systems, e.g., from the article "Third Generation Mobile—UMTS and FPLMTS", D. MacFarlane, 7th World Telecommunication Forum, Technology Summit, Vol. 2, pp. 185–188, ITU, Geneva, 3-11 October 1995. In such a future system and also in existing systems where a number of operators of either a private or a public wireless subsystem share an available frequency band radio resources are becoming scarce so that there is a need to make an efficient use of such radio resources. On the other hand, from a commercial point of view inter alia, it is highly desirable to operate wireless communication stations in the system such that energising means comprised in such a wireless communication station are being used efficiently, i.e., given the environmental circumstances, the wireless communication station should use as less power as possible. If many subscribers are present in the various subsystems, a operating wireless communication station, signals transmitted by the stations on an RF carrier cause interference to signals on neighbouring RF carriers or radio bands. For making an efficient use of the available frequency spectrum, particularly at inter-subsystem-boundaries, it is thus highly desirable to operate the system such that an optimum is achieved as to reducing interference and an economic operation of wireless communication stations.

It is an object of the present invention to provide a universal wireless communication system of the above kind making an efficient use of the available frequency spectrum while at the same time operating the wireless communication stations in an economic way as regards power consumption.

To this end the according to the present invention is characterised in that for operating the wireless communication system up to the limits of spectral band while at the same time allowing wireless communication stations to operate such that minimal power consumption is obtained under acceptable transmission conditions, the wireless communication system comprises a transmission protocol for adapting a spectral transmission characteristic of a wireless communication station comprising the following steps:

a) a radio base station of one of the wireless subsystems determines whether a wireless communication station of the other wireless subsystem is causing adjacent channel interference in a channel of the one wireless subsystem, whereby the wireless communication station of the other subsystem is identified by said radio base station, b) the radio base station of the one wireless subsystem issues a command to the wireless communication station of the other wireless subsystem in accordance with the determined interference situation, and the identified wireless communication station adjusts its spectral transmission characteristic from a first to a second characteristic in accordance with the command. The present invention is based upon the insight that individual control of the spectral transmission spectrum of an interfering wireless communication station in one subsystem by a system resource of another subsystem achieves a better overall interference control in the system and achieves better overall power saving in the wireless communication stations in the system than with an uncoordinated transmission spectrum shaping. Furthermore, such an interference bandwidth/energy adjustment does not affect the information bandwidth or other RF characteristic. In the event of a cellular and cordless radio system as subsystems such subsystems can use adjacent frequency bands while applying wide band CDMA or wide band TDMA carriers without any further mutual coordination between such subsystems beyond the issuing of the command when an interferer is recognized from a wireless communication station being operated in a neighbouring frequency band. Power consumption in a wireless communication system can typically be reduced when the wireless communication station is operated in a non-congested system. With the transmission protocol according to the present invention RF carriers can be packed densely so that the spectrum efficiency is improved.

SUMMARY OF THE INVENTION

In an embodiment of a universal wireless communication system according to the present invention, said radio base station identifies the wireless communication station from an at regular intervals transmitted code, in particular a training sequence, like signal replacing the known training sequence at regular intervals, the code being transmitted by the wireless communication station. Herewith interfering wireless communication stations can be identified easily after having been powered-up and can be commanded to adjust their transmission spectrum immediately according to the interference conditions in the system.

In an embodiment of a universal wireless communication system according to the present invention, interference measurements are done on the basis of energy to bit error measurements, the command being an instruction for narrowing the identified interfering transmit spectrum if the interference is not acceptable and being an instruction for allowing to broaden the transmit spectrum if the interference is acceptable. By measuring the signal energy in different parts of the spectrum, i.e., in the interfered channel and outside the interfered channel, it can be determined whether or not there is an interference condition and the interferer can be identified. Preferably a characteristic of a bit-error-rate versus received signal energy for a non-interfered channel can be stored in a lookup table. Then it can be easily determined from the actually measured energy and error characteristics whether or not an interference condition is present, a higher measured energy than an energy corresponding to a given bit-error-rate error characteristic, such as indicating that interference is present.

In an embodiment of a universal wireless communication system according to the present invention, the spectral transmission characteristic is adjusted by adjusting a modulation type and/or by modifying the linearity of a power amplifier and/or by adjusting transmit signal processing characteristics, and/or adjusting transmit filter characteristics. Although preferably the spectral transmission characteristic is adjusted by adjusting the transmit filter characteristic, because of the fact that a lot of power is saved when operating the wireless communication station while using a less complex filter which results in a broad transmit spectrum, preferably a digital filter, under non-interference conditions, as compared to a more complex filter which narrows the spectrum under interference conditions, broadening or narrowing of the spectrum can also be done by other means, whether or not in combination with using an adjustable filter means.

In a preferred embodiment of a universal wireless communication system according to the present invention, the command is issued via a common control channel of the system. Such a control channel can control all subsystems within the system, or a subset of subsystems within the systems, or the like, and can be a prioritized control channel. Such a control channel is thus used as an inter-subsystem control channel. In particular the interfering wireless communication station is recognised by the identifying code it is transmitting with the mechanisms described earlier.

In another embodiment of a universal wireless communication system according to the present invention, the command is issued via a network comprised in the system to which the first and the second wireless subsystem are coupled. Although in this embodiment no spectral resources are used for the inter-subsystem control channel so that the spectral efficiency is somewhat better than in the preferred embodiment, it could be the case that operators of different subsystems would not allow such an inter-operability.

BRIEF DESCRIPTION OF THE DRAWINGS

The present invention will now be described, by way of example, with reference to the accompanying drawings, wherein FIG. 1 schematically shows a universal wireless communication system according to the present invention.

Throughout the figures the same reference numerals are used for the same features.

DESCRIPTION OF THE PREFERRED EMBODIMENT

Figure 1:
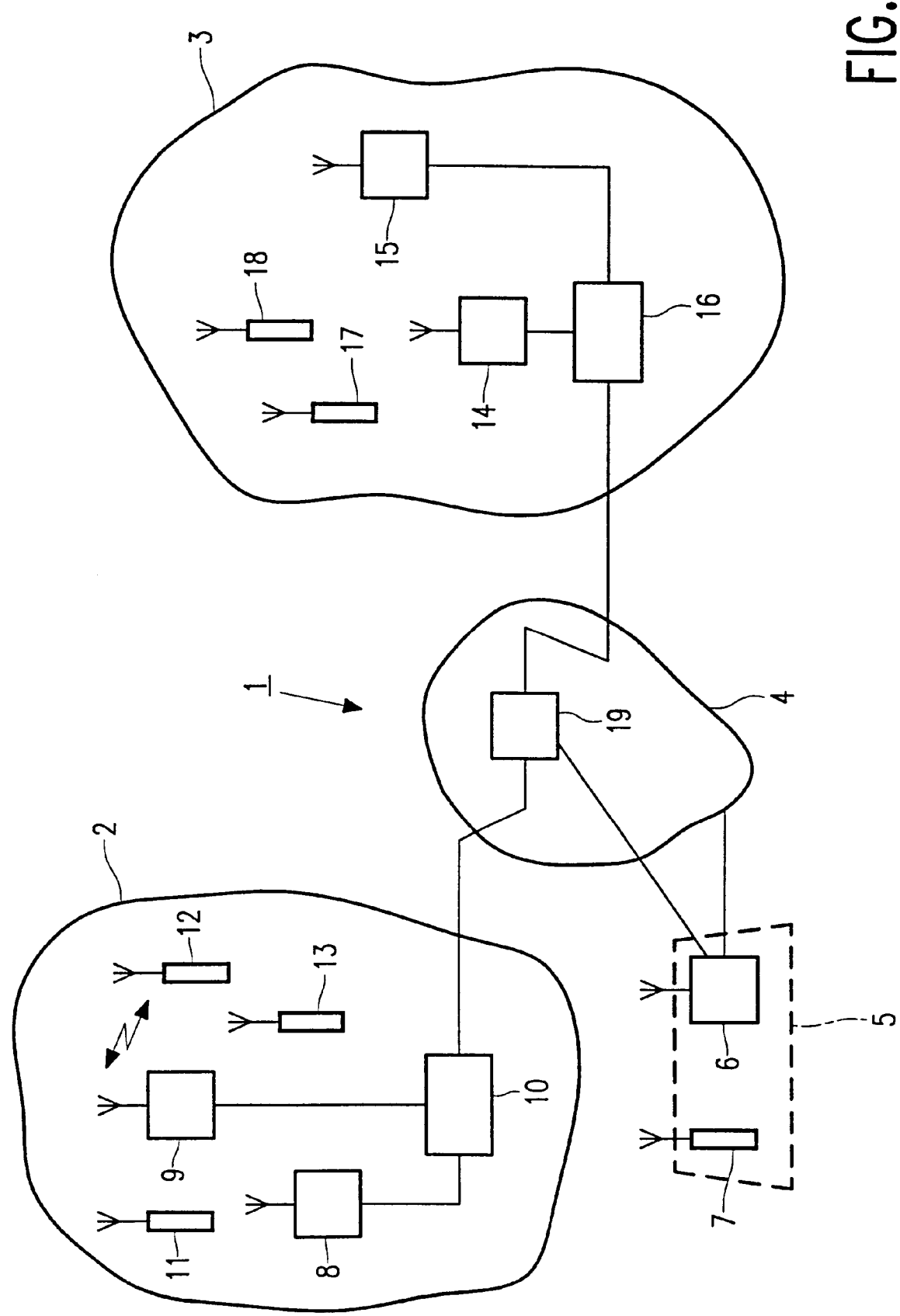

FIG. 1 schematically shows a universal wireless communication system 1 according to the present invention comprising a first wireless subsystem 2 and a second wireless subsystem 3 which can be digital cellular systems of a first and a second operator, the subsystems 2 and 3 being coupled to the public switched telephone network 4. Generally coupling the subsystems 2 and 3 can be done by any network and connection means. The system 1 further comprises a third wireless subsystem 5 which can be a cordless telephone system of which a radio base station 6 with a corresponding handset 7 are shown. The first subsystem 2 comprises radio base stations 8 and 9 coupled to the public network 4 via a mobile switching centre 10, and a plurality of wireless communication stations 11, 12 and 13. The second subsystem 3 comprises radio base stations 14 and 15 coupled to the switched network 4 via a mobile switching centre 16, and a plurality of wireless communication stations 17 and 18. The subsystems 2, 3 and 4 at least partly geographically overlap. Further shown is a coupling device 19 comprised in the network 4 for coupling the subsystems 2, 3 and 5 and for exchanging information between the subsystems 2, 3 and 5. In one embodiment according to the present invention a command from a radio base station in one of the subsystems 2, 3 and 5 is conveyed to a wireless communication station or handset of another one of the subsystems for instructing the wireless communication station or handset to adjust its spectral transmission characteristic from a first to a second characteristic. In an example, if interference is detected by said radio base station in said one subsystem from said wireless communication station or handset in said other subsystem, in a given channel, the transmission characteristic is adjusted such that a relatively narrow transmission spectrum is obtained, and if no interference is detected the transmission characteristic is adjusted such that a relatively broad spectrum is obtained. The interfering wireless communication or handset is recognised by the radio basestation detecting interference from a code transmitted by the wireless communication station or handset at regular points in time, e.g., by replacing from time to time the training sequence which is transmitted with each message by the code. In another, preferred embodiment, the command from the interfered base station is transmitted via the air interface in a control channel which can be global to the system or to a subset of subsystems. Further subsystems such as satellite systems can be included in the system 1.

Figure 2:
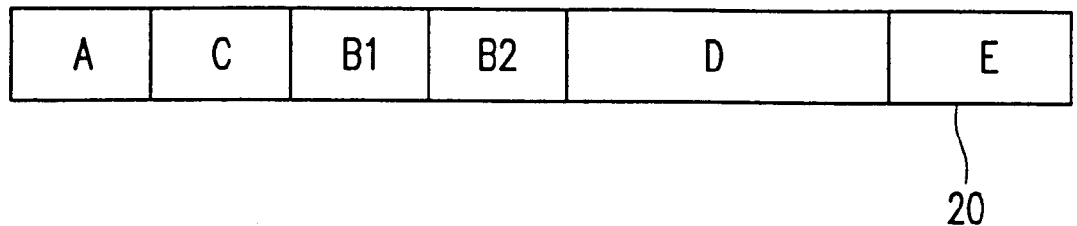
FIG. 2 shows an available frequency spectrum for the universal wireless communication system.

FIG. 2 shows an available frequency spectrum 20 for the universal wireless communication system 1 as allocated by Frequency Allocating Authorities comprising a frequency band A for the cordless subsystem 5, frequency band B1 and B2 for public digital cellular radio subsystems 2 and 3, and further a frequency band C for a private universal wireless communication subsystem (not shown), a frequency D for a universal wireless communication satellite subsystem (not shown), and a terrestrial band E comprising a subband of global control channels for exchanging the command according to the present invention inter alia. The subsystems can be implemented according to any one of available transmission schemes such as FDMA, TDMA, CDMA, ATM, or a combination thereof, any other transmission scheme. Any carrier spacing can be used from wideband carriers to small band carriers or any combination thereof.

Figure 3:
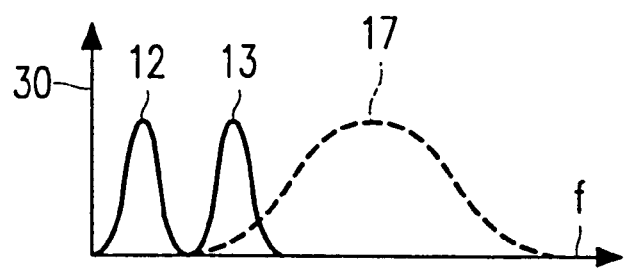
FIG. 3 shows interference control according to the present invention.
Figure 3:
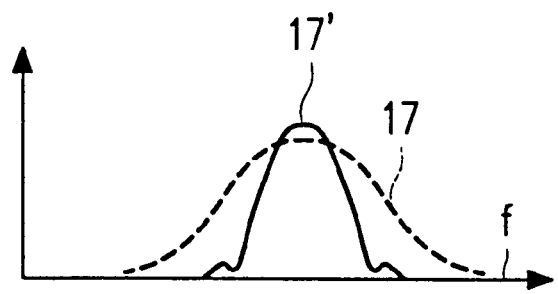

FIG. 3 shows interference control according to the present invention. Shown is the energy density frequency spectrum 30 showing channels of the wireless communication stations 12 and 13 in the subsystem 2 and an interfering channel of the wireless communication station 17 in the subsystem 3. The radio base station 9 is in radio communication with the wireless communication stations 12 and 13, and the radio base station 14 is in radio communication with the wireless communication station 17. If in the given example the radio base station 9 detects that the wireless communication station 17 causes adjacent channel interference in the channel 13 it transmits a command to the wireless communication station 17 via one of the global control channels so as to instruct the wireless communication station 17 to narrow its transmit frequency spectrum. If no interference is detected the wireless communication station is allowed to broaden its transmit frequency spectrum. These operations are preferably done by adjusting the transmit spectrum applying a less complex transmit filter so as to save considerable power in no interference is detected and applying a more complex transmit filter if interference is detected, but can be done by other means as described in the introduction of the present application. Instead of a two steps adjustment, the adjustment can be done in more than two steps, depending on the level of detected adjacent channel interference, the filter complexity increasing with an increased level of detected interference. Preferably the filter is a digital filter implemented in a digital signal processor, complexity then being expressed in the number of full additions per sample, for example.

Figure 4:
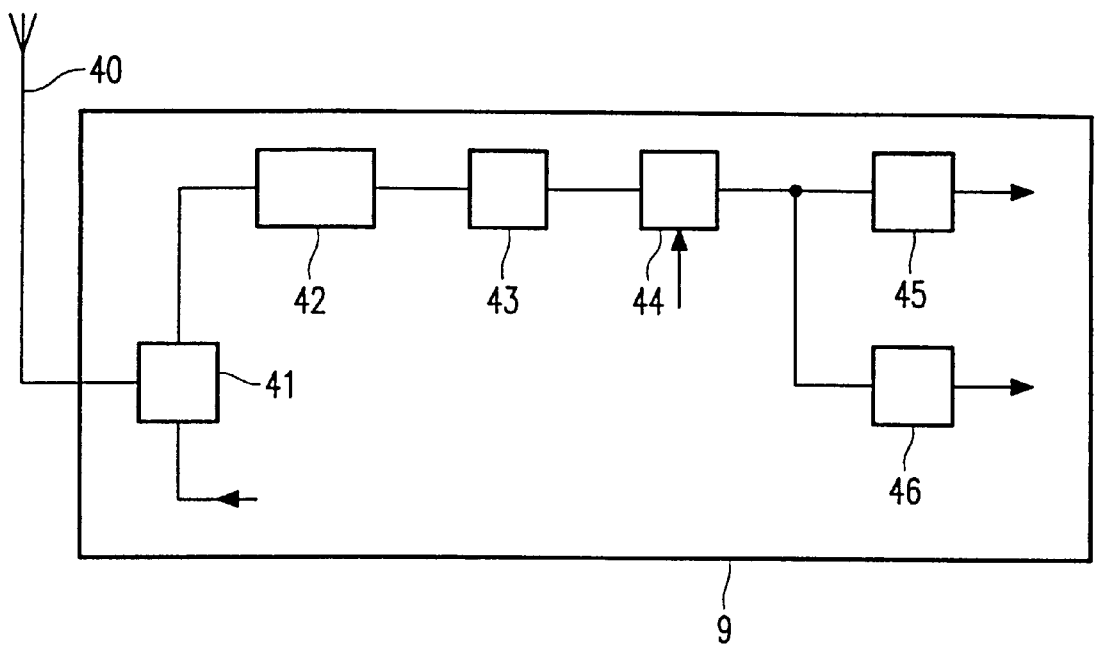
FIG. 4 shows a block diagram of a radio base station for use in the universal wireless communication system according to the present invention.

FIG. 4 shows a block diagram of the radio base station 9 for use in the universal wireless communication system 1 according to the present invention. The radio base station 9 comprises an antenna 40, a receive/transmit switch 41, and a reception branch comprising a radio frontend 42, a frequency selective filter 43, a sampler 44, and a demodulator 45 providing a demodulated bitstream. The radio base station 9 further comprises a transmit branch (not shown in detail) and a digital signal processor 46 processing samples from the sampler 44. Other usual functionality such as frequency synthesises and channel selection is not shown in detail. The digital signal processor 46 is arranged for carrying out Fast Fourier Transforms inter alia and comprises ROM and RAM memory (not shown).

Figure 5:
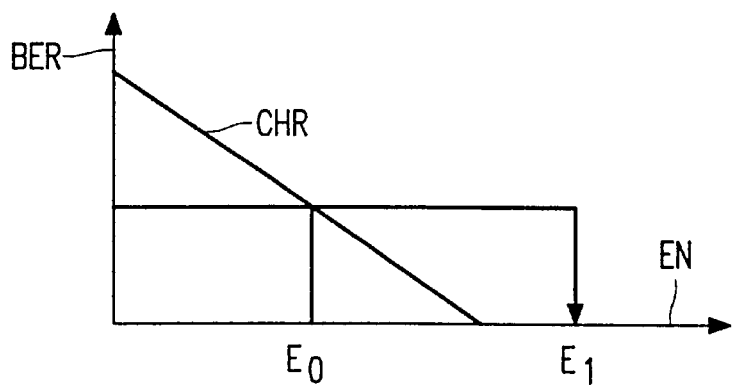
FIG. 5 shows a characteristic of a bit-error-rate versus energy.

FIG. 5 shows an error characteristic CHR of a bit-error-rate BER versus energy EN. Such a charactistic shows a well-known relationship for a bit-error-rate versus energy for a non-interfered channel for a known signal type and receiver structure. This characteristic is stored in a lookup table in the ROM of the digital signal processor 46.

Figure 6:
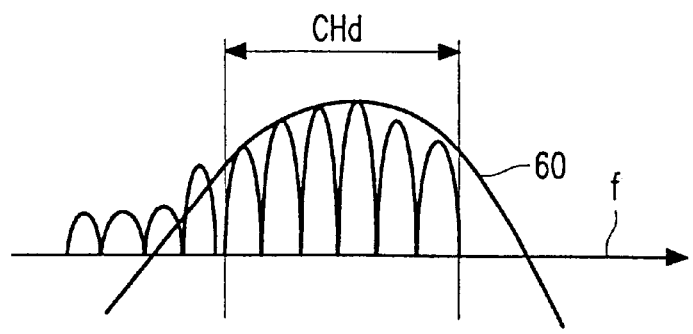
FIG. 6 shows FFT windows around a desired channel.

FIG. 6 shows frequency spectrum windows around a desired channel Chd, the windows being obtained after Fourier Transform of the samples generated by the sampler 44 and a solid line 60 indicating the Fourier Transform of the desired signal in the desired channel Chd. From the difference of measured energy and the desired energy in the frequency domain the radio base station 9 determines whether there is interference and then determines from the received code from the interfering wireless communication station 17 its identity and commands the wireless communication station 17 accordingly. Interference is present if in the channel adjacent to the desired channel the received energy is higher than the expected received energy at a given bit-error-rate, the relationship between the expected received energy and the bit-error rate for a non-interfered channel being stored in the lookup table.

Figure 7:
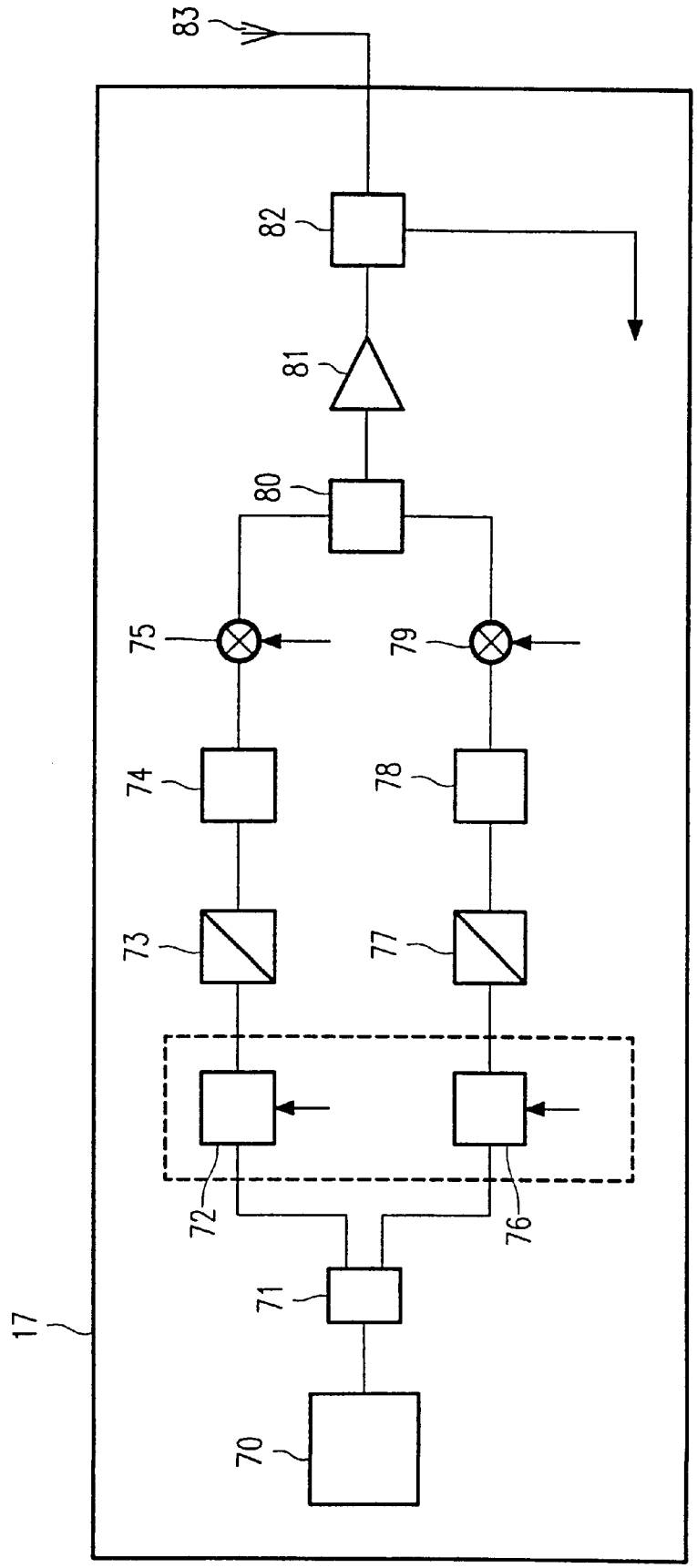
FIG. 7 shows a block diagram of a wireless communication station for use in the universal wireless communication system according to the present invention.

FIG. 7 shows a block diagram of the wireless communication station 17 for use in the universal wireless communication system 1 according to the present invention. The station 17 comprises a data processing unit 70 providing a data stream to be modulated, a channel coding unit 71 providing channel coded bitstreams to quadrature branches of the transmitter branch of the wireless communication station 17. The quadrature branches comprise a sampled digital filter 72, a digital-to-analog converter 73, an anti-aliasing filter 74, a carrier modulator 74, and a sampled digital filter 76, a digital-to-analog converter 77, an anti-aliasing filter 78, and a carrier modulator 79, respectively. Output signals of the quadrature branches are fed to a summing arrangement 80 which is coupled to a transmit power amplifier 81 which is coupled to a receive/transmit switch 82 which is coupled to an antenna 83. The wireless communication station 17 further comprises a receive branch (not shown in detail).

So there is provided a mechanism for commanding wireless communication stations to adjust their spectral transmission characteristic in accordance with the measured interference caused by the wireless communication stations in base stations. Herewith the operators of neighbouring frequency bands can use their frequency bands up to the band edges. Private subsystems are operated in an uncoordinated way within the available band, or a band is used as a common band for a plurality of subsystems. The carrier bandwidths and timing structures within the bands are different and driven by the unpredictable demand rather than by frequency band planning. In view of the foregoing it will be evident to a person skilled in the art that various modifications may be made within the spirit and the scope of the present invention as hereinafter defined by the appended claims and the present invention is thus not limited to the examples provided.

What is claimed is:

1. A universal wireless communication system in which an available radio frequency spectrum is divided among at least a first and a second wireless subsystem, the first wireless subsystem comprising at least a first radio base station and a first plurality of wireless communication stations, and the second wireless subsystem comprising at least a second radio base station and a second plurality of wireless communication stations, characterised in that for operating the wireless communication system up to the limits of spectral band while at the same time allowing wireless communication stations to operate such that minimal power consumption is obtained under acceptable transmission conditions, the wireless communication system comprises a transmission protocol for adapting a spectral transmission characteristic of a wireless communication station comprising the following steps:

a) a radio base station of one of the wireless subsystems determines whether a wireless communication station of the other wireless subsystem is causing adjacent channel interference in a channel of the one wireless subsystem, whereby the wireless communication station of the other subsystem is identified by said radio base station, b) the radio base station of the one wireless subsystem issues a command to the wireless communication station of the other wireless subsystem in accordance with the determined interference situation, and c) the identified wireless communication station adjusts its spectral transmission characteristic from a first to a second characteristic in accordance with the command.

2. A universal wireless communication system according to claim 1, wherein said radio base station identifies the wireless communication station from an at regular intervals transmitted code, in particular a training sequence, like signal replacing the known training sequence at regular intervals, the code being transmitted by the wireless communication station.

3. A universal wireless communication system according to claim 1, wherein it is determined whether there is interference in the channel of the one wireless subsystem, and, if so, determining the identity of the interfering wireless communication station.

4. A universal wireless communication system according to claim 3, wherein interference measurements are done on the basis of energy to bit error measurements, the command being an instruction for narrowing the identified interfering transmit spectrum if the interference is not acceptable and being an instruction for allowing to broaden the transmit spectrum if the interference is acceptable.

5. A universal wireless communication system according to claim 1, wherein the spectral transmission characteristic is adjusted by adjusting a modulation type and/or by modifying the linearity of a power amplifier and/or by adjusting transmit signal processing characteristics, and/or adjusting transmit power filter characteristics.

6. A universal wireless communication system according claim 1, wherein the command is issued via a common control channel of the system.

7. A universal wireless communication system according to claim 1, wherein the command is issued via a network comprised in the system to which the first and the second wireless subsystem are coupled.

8. A transmission protocol for a universal wireless communication system in which an available radio frequency spectrum is divided among at least a first and a second wireless subsystem, the first wireless subsystem comprising at least a first radio base station and a first plurality of wireless communication stations, and the second wireless subsystem comprising at least a second radio base station and a second plurality of wireless communication stations, characterised in that for operating the wireless communication system up to the limits of spectral band while at the same time allowing wireless communication stations to operate such that minimal power consumption is obtained under acceptable transmission conditions, the transmission protocol is arranged for adapting a spectral transmission characteristic of a wireless communication station in accordance with the following steps:

a) a radio base station of one of the wireless subsystems determines whether a wireless communication station of the other wireless subsystem is causing adjacent channel interference in a channel of the one wireless subsystem, whereby the wireless communication station of the other subsystem is identified by said radio base station, b) the radio base station of the one wireless subsystem issues a command to the wireless communication station of the other wireless subsystem in accordance with the determined interference situation, and c) the identified wireless communication station adjusts its spectral transmission characteristic from a first to a second characteristic in accordance with the command.

9. A wireless communication station suitable for use in a system according to any one of the claim 1, which wireless communication station is arranged for processing a command as issued from said radio base station and for adapting its transmission characteristic accordingly.

10. A radio base station for use in one subsystem of a system according to any one of the claim 1, which radio base station is arranged for issuing a command to a wireless communication station of another subsystem of the system for adapting its transmission characteristic in accordance to adjacent channel measurements carried out by said radio base station.

* * * * *

UNITED STATES PATENT AND TRADEMARK OFFICE
CERTIFICATE OF CORRECTION

PATENT NO.   : 6,167,237
DATED        : December 26, 2000
INVENTOR(S)  : Juha Rapeli It is certified that error appears in the above-identified patent and that said Letters Patent is hereby corrected as shown below:

Column 6,
Line 39, after "comprises" insert -- being arranged to carry out --.
Line 41, after "station" insert -- , the transmission protocol --.

Column 7,
Line 29, delete "characterized in that for operating the wireless communica-".
Line 30, delete "tion system up to the limits of spectral band while at the".
Line 31, delete "same time allowing wireless communication stations to".
Line 32, delete "operate such that minimal power consumption is obtained".
Line 33, delete "under acceptable transmission conditions".

Column 8,
Line 21, delete "any one of the".
Line 26, delete "any one the".

Signed and Sealed this

Twenty-ninth Day of October, 2002

Attest:

Attesting Officer

JAMES E. ROGAN
Director of the United States Patent and Trademark Office